United States Patent
Dreher et al.

(10) Patent No.: US 6,841,608 B1
(45) Date of Patent: Jan. 11, 2005

(54) THERMOHARDENING POLYMER DISPERSION

(75) Inventors: Stefan Dreher, Neustadt (DE); Bernd Reck, Grünstadt (DE); Michael Seufert, Bad Dürkheim (DE); Johannes Türk, Böhl-Iggelheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 274 days.

(21) Appl. No.: 10/110,106

(22) PCT Filed: Oct. 13, 2000

(86) PCT No.: PCT/EP00/10108

§ 371 (c)(1),
(2), (4) Date: Apr. 8, 2002

(87) PCT Pub. No.: WO01/27163

PCT Pub. Date: Apr. 19, 2001

(30) Foreign Application Priority Data

Oct. 14, 1999 (DE) .......................... 199 49 592

(51) Int. Cl.$^7$ .............................. C08J 3/02; C08K 3/20; C08L 33/14; C09J 133/14; B32B 27/00
(52) U.S. Cl. ...................... 524/457; 156/327; 428/500; 524/521
(58) Field of Search ................................. 524/457, 521; 428/500; 156/327

(56) References Cited

U.S. PATENT DOCUMENTS

| | | |
|---|---|---|
| 3,784,396 A | 1/1974 | Fourment et al. |
| 4,076,917 A | 2/1978 | Swift et al. |
| 4,670,505 A | 6/1987 | Craig |
| 4,868,016 A | 9/1989 | Lorah et al. |
| 5,143,582 A | 9/1992 | Arkens et al. |
| 5,314,943 A | 5/1994 | Steinwand |
| 6,262,159 B1 | 7/2001 | Dreher et al. |
| 6,348,530 B1 | 2/2002 | Reck et al. |

FOREIGN PATENT DOCUMENTS

| | | |
|---|---|---|
| CA | 2037214 | 9/1991 |
| DE | 22 14 450 | 10/1992 |
| DE | 197 29 161 | 1/1999 |
| DE | 199 00 459 | 7/2000 |
| DE | 199 00 460 | 7/2000 |
| EP | 0 257 567 | 3/1988 |
| EP | 445 578 | 9/1991 |
| EP | 537 910 | 4/1993 |
| EP | 0 576 128 | 12/1993 |
| EP | 0 583 086 | 2/1994 |
| EP | 0 651 088 | 5/1995 |
| EP | 0 672 920 | 9/1995 |
| EP | 1 018 523 | 7/2000 |
| JP | 08 269115 | 10/1996 |
| WO | WO 99/02591 | * 1/1999 |

OTHER PUBLICATIONS

Derwent Publications, AN 96–515029, XP–002158223, JP 08 269115, Oct. 15, 1996.

* cited by examiner

*Primary Examiner*—Patrick D. Niland
(74) *Attorney, Agent, or Firm*—Oblon, Spivak, McClelland, Maier & Neustadt, P.C.

(57) ABSTRACT

An aqueous polymer dispersion, a process for preparing it, and substrates bound on the basis of it are described.

20 Claims, No Drawings

THERMOHARDENING POLYMER DISPERSION

The present invention relates to heat-curable aqueous polymer dispersions prepared in the presence of a carboxyl-containing addition polymer and to their use as binders for moldings.

The consolidation of sheetlike fiber structures, examples being fiber webs, moldings, such as fiberboard or chipboard panels, etc., is frequently done chemically using a polymeric binder. In order to increase the strength, especially the resistance to wetness and heat, it is common to use binders containing crosslinkers which give off formaldehyde. With this, however, there is the risk of formaldehyde emission.

Numerous alternatives to the previously known binders have already been proposed in order to avoid formaldehyde emissions. For instance, U.S. Pat. No. 4,076,917 discloses binders which comprise addition polymers containing carboxylic acid or carboxylic anhydride, and β-hydroxyalkylamide crosslinkers. A disadvantage is the relatively complex preparation of the β-hydroxyalkylamides.

EP-A-445 578 discloses boards made from finely divided materials, such as glass fibers, for example, in which mixtures of high molecular mass polycarboxylic acids and polyhydric alcohols, alkanolamines or polyfunctional amines act as binders. The water resistance of the boards obtained, however, is unsatisfactory.

EP-A-583 086 discloses formaldehyde-free aqueous binders for producing fiber webs, especially glass fiber webs. The binders include a polycarboxylic acid having at least two carboxylic acid groups and also, if desired, anhydride groups, and a polyol. These binders require a phosphorus reaction accelerator in order to achieve sufficient strength in the glass fiber webs. It is noted that the presence of such a reaction accelerant may be omitted only if a highly reactive polyol is used. The highly reactive polyols referred to include β-hydroxyalkylamides.

EP-A-651 088 describes corresponding binders for substrates comprising cellulose fiber. These binders necessarily include a phosphorus reaction accelerant.

EP-A-672 920 describes formaldehyde-free binding, impregnating or coating compositions which comprise an addition polymer synthesized from from 2 to 100% by weight of an ethylenically unsaturated acid or an acid anhydride as comonomer, and at least one-polyol. The polyols comprise substituted triazine, triazinetrione, benzene, or cyclohexyl derivatives, the polyol radicals always being located in positions 1, 3, 5 of the abovementioned rings. Despite a high drying temperature, the wet tensile strengths achieved with these binders on glass fiber webs are low.

DE-A-22 14 450 describes a copolymer synthesized from from 80 to 99% by weight of ethylene and from 1 to 20% by weight of maleic anhydride. The copolymer is used for surface coating together with a crosslinking agent, in powder form or in dispersion in an aqueous medium. The crosslinking agent is a polyalcohol that contains amino groups. In order to effect crosslinking however, it is necessary to heat the system at up to 300° C.

EP-A-257 567 describes a polymer composition obtainable by emulsion polymerization of ethylenically unsaturated monomers, such as olefins, vinylaromatic compounds, α,β-ethylenically unsaturated carboxylic acids and esters thereof, ethylenically unsaturated dicarboxylic anhydrides and vinyl halides. During the polymerization a water- or alkali-soluble or -dispersible resin having a number-average molecular weight of from about 500 to 20,000 is added in order to influence the flow properties of the polymer composition. The resin is synthesized, for example, from olefins, vinylaromatic compounds, α,β-ethylenically unsaturated carboxylic acids and esters thereof or ethylenically unsaturated dicarboxylic anhydrides. The composition may be used to produce formaldehyde-free coatings on wood substrates.

EP-A-576 128 describes repulpable adhesive compositions comprising an acid-rich polymer component and a low-acid polymer component. The acid-rich polymer component is based on a monomeric mixture of from 40 to 95% of an alkyl acrylate or methacrylate and from 5 to 60% of an ethylenically unsaturated acid, such as acrylic or methacrylic acid. The low-acid polymer component is based on a monomer mixture of from 90 to 100% of an alkyl acrylate or alkyl methacrylate and from 0 to 10% of an ethylenically unsaturated acid. The composition is prepared by aqueous emulsion polymerization, the acid-rich polymer component being polymerized in the presence of the low-acid polymer component, or vice versa. The pH of the composition is adjusted to the desired level by adding ammonium hydroxide or sodium hydroxide. The composition may be used as a pressure-sensitive adhesive, laminating adhesive, adhesive for textile wovens, for tiles and packaging, and as a wood glue.

U.S. Pat. No. 5,314,943 describes a low-viscosity rapid-cure formaldehyde-free binder composition for textile materials. The composition comprises a latex, which in turn comprises a copolymer based on a vinylaromatic compound and a conjugated diene, and a water-soluble copolymer, which is obtained by copolymerizing a mixture of at least one ethylenically unsaturated polycarboxylic acid and at least one olefinically unsaturated monocarboxylic acid.

U.S. Pat. No. 4,868,016 describes a composition based on at least one thermoplastic latex polymer that is insoluble in aqueous alkaline medium, and at least one alkali-soluble polymer incompatible with the latex polymer. The latex polymer is a water-dispersed polymer which may have been synthesized from acrylic or methacrylic esters, vinylaromatic compounds, and vinyl esters, and further comprises from 0.5 to 3% by weight of an ethylenically unsaturated carboxylic acid in copolymerized form. The alkali-soluble polymer is also synthesized from said monomers, but contains from 10 to 60% by weight of an ethylenically unsaturated carboxylic acid. The composition may be used to provide substrates with a coating.

It is known that stable aqueous (meth)acrylate dispersions are obtained by emulsion polymerization in the presence of protective colloids only when at least 50% vinyl acetate, based on overall monomers, is incorporated by polymerization. If the amount is less than 50% of vinyl acetate, agglomeration takes place. U.S. Pat. No. 4,670,505 describes a solution to this problem comprising a polyacrylate dispersion prepared by emulsion polymerization in the presence of from 0.1 to 5% by weight of at least one water-soluble aminoalcohol having 2 to 36 carbon atoms and from 0.04 to 5% by weight, based in each case on overall monomers, of a protective colloid.

EP-537 910 discloses mixtures of emulsion polymers, synthesized preferably from styrene and n-butyl acrylate, with acid-rich water-soluble polymers, which when used as binders for coating materials are said to lead to coatings having good substrate wetting and high solvent resistance.

U.S. Pat. No. 5,143,582 discloses the preparation of heat-resistant web materials using a heat-curing, heat-resistant binder. The binder is free of formaldehyde and is obtained by mixing a polymer containing carboxyl, carboxylic anhydride or carboxylate groups, and a crosslinker. The crosslinker is a β-hydroxyalkylamide or a polymer or copolymer thereof. The polymer crosslinkable with the β-hydroxyalkylamide is, for example, synthesized from unsaturated mono- or dicarboxylic acids, salts of unsaturated mono- or dicarboxylic acids, or unsaturated anhydrides. Self-curing polymers are obtained by copolymerizing the β-hydroxyalkylamides with carboxyl-containing comonomers.

DE-A-197 29 161 describes heat-curable aqueous polymer dispersions (polymer 1) prepared in the presence of a carboxyl-containing polymer (polymer 2) and a surface-active amine. In addition, the dispersions may optionally include an alkanolamine having at least two hydroxyl groups. The preparation of a polymer dispersion based on a polymer 1 by polymerization in the presence of a polymer 2 incorporating a reaction product of an ethylenically unsaturated carboxylic anhydride and at least one alkoxylated alkylamine is not described in this document. When the compositions of DE-A-197 29 161 are used as heat-curable binders for fibrous and particulate substrates, an advantage is their viscosity at high solids content. They give shaped parts with good mechanical strength, whose dimensional stability under humid conditions is, however, still in need of improvement. Moreover, the colloidal stability of these polymer dispersions is very low; even on dilution with water, it is not uncommon to observe agglomeration or coagulation.

The unpublished German patent application bearing the file reference P 199 00 459.5 describes a similar polymer dispersion in which, however, the dispersed polymer particles possess a larger amount of α,β-ethylenically unsaturated carboxylic acids.

The unpublished German patent application bearing the file reference P 199 00 460.9 describes a polymer dispersion comprising i) polymer particles comprising units of ethylenically unsaturated monomers dispersed in an aqueous medium, ii) a water-soluble polymeric polyelectrolyte which along a polymeric structure carries a large number of ionic groups of uniform charge character, or groups which may be ionized to such groups, and iii) an ionic surfactant which carries an ionic group whose charge character is opposite to that of the polymeric polyelectrolyte, or a group which may be ionized thereto. The polyelectrolyte is synthesized preferably from units of ethylenically unsaturated monomers, examples being ethylenically unsaturated mono- or dicarboxylic acids, and units of N-substituted amides of such acids, but no alkoxylated amides are disclosed. The polymer dispersion may be coagulated by simple dilution with water.

It is an object of the present invention to provide formaldehyde-free binders for substrates, such as moldings, for example. These binders should preferably be suitable for fibrous and particulate substrates. In particular, they should give the substrate high mechanical strength and dimensional stability even under humid conditions. The binder should preferably have a high colloidal stability and/or a low viscosity at high solids content. The binder should be able to be diluted, infinitely if possible, with water or dilute salt and surfactant solutions without coagulation of the latex particles.

It is a further object of the invention to provide a process for preparing a heat-curable polymer dispersion of this kind.

It is yet another object of the invention to provide substrates produced using a heat-curable polymer dispersion of this kind.

We have found that these objects are achieved, surprisingly, by means of an aqueous polymer dispersion comprising dispersed polymer particles of at least one addition polymer A1 obtainable by free-radical emulsion polymerization in the presence of an addition polymer A2 synthesized from from 50 to 99.5% by weight of at least one ethylenically unsaturated mono- and/or dicarboxylic acid, from 0.5 to 50% by weight of at least one ethylenically unsaturated compound selected from esters of ethylenically unsaturated monocarboxylic acids and monoesters and diesters of ethylenically unsaturated dicarboxylic acids with an amine having at least one hydroxyl group, up to 20% by weight of at least one further monomer.

In connection with the monomer components of the polymer A1, alkyl below is preferably straight-chain or branched $C_1$–$C_{22}$ alkyl radicals, especially $C_1$–$C_{12}$, and with particular preference $C_1$–$C_6$, alkyl radicals, such as methyl, ethyl, n-propyl, n-butyl, sec-butyl, tert-butyl, n-pentyl, n-hexyl, 2-ethylhexyl, n-dodecyl or n-stearyl.

Hydroxyalkyl is preferably hydroxy-$C_1$–$C_6$ alkyl, in which the alkyl radicals may be straight-chain or branched, and in particular is 2-hydroxyethyl, 2- or 3-hydroxypropyl, 2-methyl-2-hydroxypropyl, and 4-hydroxybutyl.

Cycloalkyl is preferably $C_5$–$C_7$ cyclohexyl, especially cyclopentyl and cyclohexyl.

Aryl is preferably phenyl or naphthyl.

The polymer A1 is a free-radical emulsion polymer. It may be prepared using all monomers that can be polymerized by free-radical polymerization. In general, the polymer is synthesized from from 80 to 100% by weight, preferably from 85 to 99.9% by weight, based on the overall weight of the monomers for the polymer, of at least one ethylenically unsaturated principal monomer, and from 0 to 20% by weight, preferably from 0.1 to 15% by weight, based on the overall weight of the monomers for the polymer, of at least one ethylenically unsaturated comonomer.

The principal monomer is preferably selected from esters of preferably $C_3$–$C_6$ α,β-monoethylenically unsaturated mono- or dicarboxylic acid, such as acrylic acid, methacrylic acid, maleic acid, fumaric acid, and itaconic acid, with $C_1$–$C_{12}$, preferably $C_1$–$C_8$ alkanols. Particular such esters are methyl, ethyl, n-butyl, isobutyl, tert-butyl, n-pentyl, isopentyl, and 2-ethylhexyl acrylate and/or methacrylate;

vinylaromatic compounds, preferably styrene, α-methylstyrene, o-chlorostyrene, vinyltoluenes, and mixtures thereof;

vinyl esters of $C_1$–$C_{18}$ mono- or dicarboxylic acids, such as vinyl acetate, vinyl propionate, vinyl n-butyrate, vinyl laurate and/or vinyl stearate;

butadiene;

linear 1-olefins, branched-chain 1-olefins or cyclic olefins, such as ethene, propene, butene, isobutene, pentene, cyclopentene, hexene, and cyclohexene, for example. Also suitable are oligoolefins prepared using metallocene catalysis and having a terminal double bond, such as oligopropene or oligohexene, for example;

acrylonitrile, methacrylonitrile;

vinyl and allyl alkyl ethers having 1 to 40 carbon atoms in the alkyl radical, said alkyl radical possibly carrying further substituents such as one or more hydroxyl groups, one or more amino or diamino groups, or one or more alkoxylated groups, examples being methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino) ethyl vinyl ether, methyldiglycol vinyl ether, and the corresponding allyl ethers, and/or mixtures thereof.

Particularly preferred principal monomers are styrene, methyl methacrylate, n-butyl acrylate, ethyl acrylate, 2-ethylhexyl acrylate, vinyl acetate, ethene, and butadiene.

The comonomer is preferably selected from ethylenically unsaturated mono- or dicarboxylic acids or their anhydrides, preferably acrylic acid, methacrylic acid, methacrylic anhydride, maleic acid, maleic anhydride, fumaric acid and/or itaconic acid;

acrylamides and alkyl-substituted acrylamides, such as acrylamide, methacrylamide, N,N-dimethylacrylamide, N-methylolmethacrylamide, N-tert-butylacrylamide, N-methylmethacrylamide and mixtures thereof;

sulfo-functional monomers, such as allylsulfonic acid, methallylsulfonic acid, styrenesulfonic acid, vinylsulfonic acid, 2-acrylamido-2-methylpropanesulfonic acid, allyloxybenzenesulfonic acid, their corresponding alkali metal or ammonium salts, and mixtures thereof, and also sulfopropyl acrylate and/or sulfopropyl methacrylat;

$C_1$–$C_4$ hydroxyalkyl esters of $C_3$–$C_6$ mono- or dicarboxylic acids, especially of acrylic acid, methacrylic acid or maleic acid, or their derivatives alkoxylated with from 2 to 50 mol of ethylene oxide, propylene oxide, butylene oxide or mixtures thereof, or esters of the above-mentioned acids with $C_1$–$C_{18}$ alcohols alkoxylated with from 2 to 50 mol of ethylene oxide, propylene oxide, butylene oxide or mixtures thereof, examples being hydroxyethyl acrylate, hydroxyethyl methacrylate, hydroxypropyl acrylate, hydroxypropyl methacrylate, 1,4-butanediol monoacrylate, ethyldiglycol acrylate, methylpolyglycol acrylate (11 EO), (meth) acrylic esters of $C_{13}/C_{15}$ oxo alcohol reacted with 3, 5, 7, 10 or 30 mol of ethylene oxide, and mixtures thereof;

vinylphosphonic acids and their salts, dimethyl vinylphosphonate, and other phosphorus monomers;

alkylaminoalkyl (meth)acrylates or alkylaminoalkyl (meth)acrylamides or quaternization products thereof, such as, for example, 2-(N,N-dimethylamino)ethyl (meth)acrylate, 2-(N,N,N-trimethylammonium)ethyl methacrylate chloride, 3-(N,N-dimethylamino)propyl (meth)acrylate, 2-dimethylaminoethyl(meth) acrylamide, 3-dimethylaminopropyl(meth)acrylamide, 3-trimethylammoniumpropyl(meth)acrylamide chloride and mixtures thereof;

allyl esters of $C_1$–$C_{30}$ monocarboxylic acids;

N-vinyl compounds, such as N-vinylformamide, N-vinyl-N-methylformamide, N-vinylpyrrolidone, N-vinylimidazole, 1-vinyl-2-methylimidazole, 1-vinyl-2-methylimidazoline, 2-vinylpyridine, 4-vinylpyridine, N-vinylcarbazole and/or N-vinylcaprolactam;

diallyldimethylammonium chloride, vinylidene chloride, vinyl chloride, acrolein, methacrolein;

monomers containing 1,3-diketo groups, such as, for example, acetoacetoxyethyl (meth)acrylate or diacetoneacrylamide, monomers containing urea groups, such as ureidoethyl (meth)acrylate, acrylamidoglycolic acid, and methyl methacrylamidoglycolate;

monomers containing silyl groups, such as, for example, trimethoxysilylpropyl methacrylate;

monomers containing glycidyl groups, such as, for example, glycidyl methacrylate.

Particularly preferred comonomers are hydroxyethyl acrylate, hydroxypropyl acrylate, hydroxybutyl acrylate, hydroxyethyl methacrylate and mixtures thereof. Very particular preference is given to hydroxyethyl acrylate and hydroxyethyl methacrylate, especially in amounts of from 2 to 20% by weight, based on the overall monomer A1.

The polymer A2 contains from 50 to 99.5% by weight, preferably from 70 to 99% by weight, of structural elements derived from at least one ethylenically unsaturated mono- or dicarboxylic acid.

If desired, these acids may also be present partly or fully in the form of a salt in the polymer. The acidic form is preferred.

The polymer A2 is preferably soluble in water to the extent of more than 10 g/l (25° C.).

Ethylenically unsaturated carboxylic acids which may be used have already been mentioned above in connection with the polymer A1. Preferred carboxylic acids are $C_3$ to $C_{10}$ monocarboxylic acids and $C_4$ to $C_8$ dicarboxylic acids, especially acrylic acid, methacrylic acid, crotonic acid, fumaric acid, maleic acid, 2-methylmaleic acid and/or itaconic acid. Particular preference is given to acrylic acid, methacrylic acid, maleic acid and mixtures thereof. In the preparation of the polymer A2 it is of course also possible to use, instead of or together with the acids, their anhydrides, such as maleic anhydride, acrylic anhydride or methacrylic anhydride.

The polymer A2 further contains from 0.5 to 50% by weight, preferably from 1 to 30% by weight, of at least one ethylenically unsaturated compound selected from esters of ethylenically unsaturated monocarboxylic acids and monoesters and diesters of ethylenically unsaturated dicarboxylic acids with at least one hydroxyl-containing amine, in copolymerized form.

The polymer A2 is preferably in the form of a comb polymer having covalently bonded amine side chains.

Monocarboxylic acids suitable as components of the esters are the abovementioned $C_3$ to $C_{10}$ monocarboxylic acids, especially acrylic acid, methacrylic acid, crotonic acid and mixtures thereof.

Dicarboxylic acids suitable as components of the monoesters and diesters are the abovementioned $C_4$ to $C_8$ dicarboxylic acids, especially fumaric acid, maleic acid, 2-methylmaleic acid, itaconic acid, and mixtures thereof.

The amine having at least one hydroxyl group is preferably selected from secondary and tertiary amines containing at least one $C_6$ to $C_{22}$ alkyl, $C_6$ to $C_{22}$ alkenyl, aryl-$C_6$ to $C_{22}$ alkyl or aryl-$C_6$ to $C_{22}$ alkenyl radical, it being possible for the alkenyl group to have 1, 2 or 3 nonadjacent double bonds.

The amine is preferably hydroxyalkylated and/or alkoxylated. Alkoxylated amines preferably have one or two alkylene oxide residues with terminal hydroxyl groups. Preferably, the alkylene oxide residues each have from 1 to 100, preferably from 1 to 50, identical or different alkylene oxide units, distributed randomly or in the form of blocks. Preferred alkylene oxides are ethylene oxide, propylene oxide and/or butylene oxide. Ethylene oxide is particularly preferred.

The polymer A2 preferably incorporates an unsaturated compound based on an amine component containing at least one amine of the formula $$R^cNR^aR^b$$

where $R^c$ is $C_6$ to $C_{22}$ alkyl, $C_6$ to $C_{22}$ alkenyl, aryl-$C_6$–$C_{22}$ alkyl or aryl-$C_6$–$C_{22}$ alkenyl, it being possible for the alkenyl radical to have 1, 2 or 3 nonadjacent double bonds, $R^a$ is hydroxy-$C_1$–$C_6$ alkyl or a radical of the formula II $$—(CH_2CH_2O)_x(CH_2CH(CH_3)O)_y—H \qquad (II)$$

where in the formula II the sequence of the alkylene oxide units is arbitrary and x and y independently of one another are integers from 0 to 100, preferably from 0 to 50, the sum of x and y being >1, $R^b$ is hydrogen, $C_1$ to $C_{22}$ alkyl, hydroxy-$C_1$–$C_6$ alkyl, $C_6$ to $C_{22}$ alkenyl, aryl-$C_6$–$C_{22}$ alkyl, aryl-$C_6$–$C_{22}$ alkenyl or $C_5$ to $C_8$ cycloalkyl, it being possible for the alkenyl radical to have 1, 2 or 3 nonadjacent double bonds, or $R^b$ is a radical of the formula III

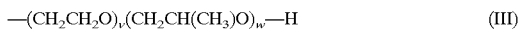  (III)

where
in the formula III the sequence of the alkylene oxide units is arbitrary and v and w independently of one another are integers from 0 to 100, preferably from 0 to 50.

Preferably $R^c$ is $C_8$ to $C_{20}$ alkyl or $C_8$ to $C_{20}$ alkenyl, it being possible for the alkenyl radical to have 1, 2 or 3 nonadjacent double bonds. $R^c$ is preferably the hydrocarbon radical of a saturated or mono- or polyunsaturated fatty acid. Preferred radicals $R^c$ are, for example, n-octyl, ethylhexyl, undecyl, lauryl, tridecyl, myristyl, pentadecyl, palmityl, margarinyl, stearyl, palmitoleinyl, oleyl and linolyl.

With particular preference, the amine component comprises an alkoxylated fatty amine or an alkoxylated fatty amine mixture. The ethoxylates are particularly preferred. Use is made in particular of alkoxylates of amines based on naturally occurring fatty acids, such as tallow fatty amines, for example, which contain predominantly saturated and unsaturated $C_{14}$, $C_{16}$ and $C_{18}$ alkylamines, or cocoamines, containing saturated, mono- and diunsaturated $C_6$–$C_{22}$, preferably $C_{12}$–$C_{14}$ alkylamines. Amine mixtures suitable for alkoxylation are, for example, various Armeen® grades from Akzo or Noram® grades from Ceca.

Examples of suitable commercially available alkoxylated amines are the Noramox® grades from Ceca, preferably ethoxylated oleyl-amines, such as Noramox® 05 (5 EO units), and the products from BASF AG marketed under the brand name Lutensol®FA.

Copolymerization of the abovementioned esters, monoesters and diesters generally brings about pronounced stabilization of the polymer dispersion of the invention. The polymer dispersions of the invention reliably retain their colloidal stability of the latex particles on dilution with water or dilute electrolytes or surfactant solutions.

The esterification for preparing the above-described esters, monoesters and diesters takes place in accordance with customary techniques known to the skilled worker. To prepare esters of unsaturated monocarboxylic acids, the free acids or suitable derivatives, such as anhydrides, halides, e.g., chlorides, and C, to $C_4$ alkyl esters may be used. The preparation of monoesters of unsaturated dicarboxylic acids takes place preferably starting from the corresponding dicarboxylic anhydrides. The reaction is preferably effected in the presence of a catalyst, such as a dialkyl titanate or an acid, such as sulfuric acid, toluenesulfonic acid, or methanesulfonic acid, for example. The reaction takes place generally at reaction temperatures from 60 to 200° C. In accordance with one appropriate embodiment, the reaction takes place in the presence of an inert gas, such as nitrogen. Water formed during the reaction may be removed from the reaction mixture by means of appropriate measures, such as distillation. The reaction may take place if desired in the presence of customary polymerization inhibitors. Essentially, the esterification reaction may be conducted to completion or just to a partial conversion. If desired, one of the ester components, preferably the hydroxyl-containing amine, may be used in excess. The extent of esterification may be determined by means of infrared spectroscopy.

In one preferred embodiment, the unsaturated esters, monoesters or diesters are prepared and further reacted to the polymers A2 used in accordance with the invention without isolation of the esters, the two reactions preferably taking place in succession in the same reaction vesssel.

To prepare the polymers A2 it is preferred to use a reaction product of a dicarboxylic anhydride, preferably maleic anhydride, and one of the above-described hydroxyl-containing amines.

In addition to the carboxylic acid and the ester, monoester and/or diester constituents, the polymer A2 may also contain in copolymerized form from 0 to 20% by weight, preferably from 0.1 to 10% by weight, of other monomers. Monomers which may be used are the monomers specified in connection with polymer A1, particular preference being given to vinylaromatic compounds, such as styrene, olefins, examples being ethylene, or (meth)acrylic esters such as methyl (meth)acrylate, ethyl (meth)acrylate, n-butyl (meth)acrylate, 2-ethylhexyl (meth)acrylate, and mixtures thereof.

The polymers A2 are prepared preferably by free-radical polymerization in bulk or in solution. Examples of suitable solvents for the solvent polymerization are water, water-miscible organic solvents such as alcohols and ketones, examples being methanol, ethanol, n-propanol, isopropanol, n-butanol, acetone, methyl ethyl ketone, etc., and mixtures thereof. Examples of suitable polymerization initiators are peroxides, hydroperoxides, peroxodisulfates, percarbonates, peroxo esters, hydrogen peroxide and azo compounds, as described in more detail below for the preparation of the polymer dispersions of the invention. If desired, the polymers A2 may be prepared separately and isolated and/or purified by a conventional method. Preferably, the polymers A2 are prepared directly before the preparation of the polymer dispersions of the invention and they are used without isolation for the dispersion polymerization.

The polymers A2 may advantageously also be prepared by means of polymer-analogous reaction. For this purpose a polymer incorporating from 80 to 100% by weight of at least one ethylenically unsaturated mono- and/or dicarboxylic acid and from 0 to 20% by weight of the abovementioned other polymers may be reacted with at least one hydroxyl-containing amine.

Suitable ethylenically unsaturated mono- and dicarboxylic acids are those mentioned above as components of the polymers A1 and A2. Suitable amines having at least one hydroxyl group are likewise as mentioned above. In the polymer suitable for polymer-analogous reaction, the acids may, if desired, be present fully or partly in the form of a derivative, preferably a C, to $C_6$ alkyl ester.

Preparing the polymers A2 by means of polymer-analogous reaction is preferably done in an appropriate nonaqueous solvent or in bulk. In the case of the reaction in bulk, the amine component may if desired be used in excess, so as to act as solvent. Preferred solvents are those which form an azeotrope with water and so make it easy to remove the water formed during the reaction. The reaction preferably takes place in the presence of an esterification catalyst, as described above. The reaction temperature is preferably in a range from 100 to 200° C. Water formed during the reaction may be removed by means of appropriate measures, such as distillation, for example.

The weight ratio of polymer A1 to polymer A2, based on solids, is preferably in the range from 7:1 to 1:7, in particular from 3:1 to 1:3.

In addition to the polymers A1 and A2, the latices of the invention may further comprise from 0 to 50% by weight, preferably from 0.1 to 40% by weight, based on the polymer A2, of at least one surface-active, alkoxylated, preferably ethoxylated or propoxylated, alkylamine. Preferred alkylamines are the alkylamines of the formula $R^cNR^aR^b$, as defined above, which are also present in the polymer A2, particular preference being given to alkylamines of the formula

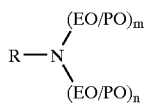

where R is an alkyl, alkenyl or alkylvinyl radical having at least 6 carbon atoms and m and n independently of one another are ≧1. Preferred radicals R have 8 to 22 carbon atoms.

The alkoxylated alkylamines present in the polymer A2, and the additional alkylamine crosslinkers, may be identical or different compounds.

If desired, the polymer dispersion of the invention may comprise further crosslinkers, an example being an amine or amide crosslinker having at least two hydroxyl groups. Particularly suitable crosslinkers are the alkanolamines disclosed in DE 197 29 161, which are hereby made part of the disclosure content of the present invention by reference.

Appropriate crosslinkers further include preferably β-hydroxyalkylamines of the formula

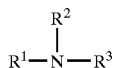

where $R^1$ is a hydrogen atom, a $C_1$ to $C_{10}$ alkyl group, a $C_1$ to $C_{10}$ hydroxyalkyl group, or a radical of the formula IV —(CH$_2$CH$_2$O)$_x$(CH$_2$CH(CH$_3$)O)$_y$—H  (IV)

where in the formula IV the sequence of the alkylene oxide units is arbitrary and x and y independently of one another are integers from 0 to 100, the sum of x and y being >1, and $R^2$ and $R^3$ independently of one another are a $C_1$ to $C_{10}$ hydroxyalkyl group.

With particular preference, $R^2$ and $R^3$ independently of one another are a $C_2$ to $C_5$ hydroxyalkyl group and $R^1$ is a hydrogen atom, a $C_1$ to $C_5$ alkyl group or a $C_2$ to $C_5$ hydroxyalkyl group.

Particular preference is given to diethanolamine, triethanolamine, diisopropanolamine, triisopropanolamine, methyldiethanolamine, butyldiethanolamine and methyldiisopropanolamine, especially triethanolamine.

Further preferred β-hydroxyalkylamines are the amines disclosed as component A in DE 196 21 573, which is hereby made part of the disclosure content of the present invention by reference. They include preferably linear or branched aliphatic compounds containing per molecule at least two functional amino groups of type (a) or (b)

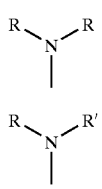

where R is hydroxyalkyl and R' is alkyl, preferably a compound of formula I

where
A is $C_2$–$C_{18}$ alkylene substituted or unsubstituted by one or more groups selected independently of one another from alkyl, hydroxyalkyl, cycloalkyl, OH and NR$^6$R$^7$, R$^6$ and R$^7$ independently of one another being H, hydroxyalkyl or alkyl, which is uninterrupted or interrupted by one or more oxygen atoms and/or NR$^5$ groups, R$^5$ being H, hydroxyalkyl, (CH$_2$)$_n$NR$^6$R$^7$, where n is from 2 to 5 and R$^6$ and R$^7$ are as defined above, or alkyl, which may in turn be interrupted by one or more NR$^5$ groups, R$^5$ possessing the above-mentioned definitions, and/or substituted by one or more NR$^6$R$^7$ groups, R$^6$ and R$^7$ possessing the abovementioned definitions;
or A is a radical of the formula:

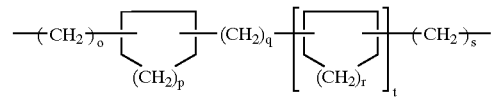

where
o, q and s independently of one another are 0 or an integer from 1 to 6,
p and r independently of one another are 1 or 2, and
t is 0, 1 or 2,
it also being possible for the cycloaliphatic radicals to be substituted by 1, 2 or 3 alkyl radicals, and
$R^1$, $R^2$ and $R^3$ and $R^4$ independently of one another are H, hydroxyalkyl, alkyl or cycloalkyl.

Preferred β-hydroxyalkylamines of relatively high functionality are, in particular, at least doubly ethoxylated amines having a molar weight of less than 1000 g/mol, such as diethanolamine, triethanolamine and ethoxylated diethylenetriamine, for example, preferably stoichiometrically ethoxylated diethylenetriamine, i.e., diethylenetriamine, in which on average all NH hydrogen atoms are monoethoxylated.

Particularly suitable additional crosslinkers include β-hydroxyalkylamides, preferably the β-hydroxyalkylamides specified in U.S. Pat. No. 5,143,582, of the formula

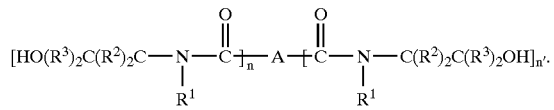

Particularly preferred β-hydroxyalkylamides of the above formula are those in which $R^1$ is hydrogen, a short-chain alkyl group, or HO(R$^3$)$_2$C(R$^2$)$_2$C—, n and n' are each 1, —A— is a (CH$_2$)$_m$— group, m is from 0 to 8, preferably from 2 to 8, $R^2$ in each case is hydrogen, and in each case one of the $R^3$ groups is hydrogen and the other is hydrogen or $C_1$–$C_5$ alkyl. Bis[N,N-di(2-hydroxyethyl)]adipamide is particularly preferred.

The addition of the crosslinker generally brings about better curing of the compositions of the invention at a given curing temperature, or, respectively, curing at low temperature for a given curing time. The weight fraction of the crosslinker relative to the sum of polymer A1 and A2 is from 0 to 30% by weight, preferably from 0.1 to 15% by weight.

In addition, a reaction accelerant may be added to the polymer dispersions of the invention. Preferred such accelerants are phosphorus compounds, especially hypophosphorous acid and its alkali metal salts and alkaline earth metal salts, or alkali metal tetrafluoroborates. Further reaction accelerants which may be added include salts of Mn(II), Ca(II), Zn(II), Al(III), Sb(III) or Ti(IV), or strong acids, such as para-toluenesulfonic acid, trichloroacetic acid and chlorosulfonic acid. The weight fraction of the reaction accelerant relative to the sum of polymer A1 and A2 is from 0.1 to 5% by weight, preferably from 0.1 to 2% by weight.

Particularly preferred compositions of the polymer dispersions of the invention are as follows:
from 70 to 50% by weight of polymer A1,
from 30 to 50% by weight of polymer A2 and, if desired,
from 0 to 10% by weight of surface-active alkoxylated alkylamine,
from 0 to 20% by weight of hydroxyl-containing crosslinkers,
from 0 to 5% by weight of reaction accelerant.

The invention further provides a process for preparing an aqueous polymer dispersion, as described above, which involves reacting at least one ethylenically unsaturated monomer by free-radical emulsion polymerization to give an addition polymer A1, the polymerization taking place in the presence of at least one addition polymer A2.

The polymer dispersion of the invention is prepared preferably by aqueous emulsion polymerization, a batchwise, semicontinuous or continuous procedure being possible. It has been found advantageous to meter the polymer A2 together with monomers of the polymer A1, in the form of an emulsion feed, into the reaction vessel. If desired, some or all of the constituent monomers of the polymer A1, and the polymer A2, may be supplied to the reaction vessel by way of two or more separate feed streams. The monomers may be supplied to the reaction vessel either in preemulsified form or in non-preemulsified form. In one preferred embodiment, at least some of the polymer A2 is supplied to the reaction vessel together with at least one monomer component A1. Advantageously, the aqueous polymer dispersions of the invention that are obtained have a lower viscosity than conventional dispersions. The polymer A2 may be used in whole or in part as an initial charge to the reactor. The use of a defined amount of a seed latex as initial charge is advantageous for the polymer dispersions of the invention, for the purpose of targeted establishment of a particle size distribution. In this case from 0 to 25% by weight, preferably from 0.1 to 10% by weight, based on the polymer A1, of an appropriate seed latex may be used.

The polymer dispersion is generally prepared in water as the dispersing medium. However, it is also possible for water-miscible organic solvents to be present, such as alcohols and ketones, examples being methanol, ethanol, n-propanol, isopropanol, n-butanol, acetone or methyl ethyl ketone, in a proportion of up to approximately 30% by volume.

The polymer A1, therefore, is prepared by aqueous emulsion polymerization in the presence of the polymer A2, and, if present, preferably in the presence of a surface-active amine, as described above.

Preferably, no additional emulsifiers are added to the dispersions of the invention.

The polymerization is preferably conducted in the presence of compounds which form free radicals (initiators). The amount required of these compounds is preferably from 0.05 to 10, with particular preference from 0.2 to 5% by weight, based on the monomers used in the polymerization.

Examples of suitable polymerization initiators are peroxides, hydroperoxides, peroxodisulfates, percarbonates, peroxo esters, hydrogen peroxide, and azo compounds. Examples of initiators, which can be soluble in water or else insoluble in water, are hydrogen peroxide, dibenzoyl peroxide, dicyclohexyl peroxodicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, lithium, sodium, potassium and ammonium peroxodisulfates, azodiisobutyronitrile, 2,2'-azobis(2-amidinopropane) diihydrochloride, 2-(carbamoylazo) isobutyronitrile, and 4,4'-azobis(4-cyanovaleric acid). The known redox initiator systems as well, such as $H_2O_2$/ascorbic acid or tert-butyl hydroperoxide/sodium hydroxymethanesulfinate, for example, can be used as polymerization initiators.

The initiators can be employed alone or in a mixture with one another, examples being mixtures of hydrogen peroxide and sodium peroxodisulfate. For polymerization in an aqueous medium it is preferred to use water-soluble initiators.

In order to prepare polymers having a low average molecular weight it is often judicious to conduct the copolymerization in the presence of regulators. Customary regulators can be used for this purpose, examples being organic compounds containing SH groups, such as 2-mercaptoethanol, 2-mercaptopropanol, mercaptoacetic acid, tert-butyl mercaptan, n-octyl mercaptan, n-dodecyl mercaptan and tert-dodecyl mercaptan, hydroxylammonium salts such as hydroxylammonium sulfate, formic acid, sodium bisulfite, or isopropanol. The polymerization regulators are generally used in amounts of from 0.05 to 5% by weight, based on the monomers.

In order to prepare copolymers of relatively high molecular weight it is often judicious to conduct the polymerization in the presence of crosslinkers. Such crosslinkers are compounds having two or more ethylenically unsaturated groups, such as, for example, diacrylates or dimethacrylates of at least dihydric saturated alcohols, examples being ethylene glycol diacrylate, ethylene glycol dimethacrylate, 1,2-propylene glycol diacrylate, 1,2-propylene glycol dimethacrylate, 1,4-butanediol diacrylate, 1,4-butanediol dimethacrylate, hexanediol diacrylate, hexanediol dimethacrylate, neopentyl glycol diacrylate, neopentyl glycol dimethacrylate, 3-methylpentanediol diacrylate and 3-methylpentanediol dimethacrylate. The acrylic and methacrylic esters of alcohols having more than 2 OH groups can also be used as crosslinkers, an example being trimethylolpropane triacrylate or trimethylolpropane trimethacrylate. A further class of crosslinkers are diacrylates or dimethacrylates of polyethylene glycols or polypropylene glycols having molecular weights of in each case from 200 to 9000.

In addition to the homopolymers of ethylene oxide or propylene oxide it is also possible to use block copolymers of ethylene oxide and propylene oxide or copolymers of ethylene oxide and propylene oxide containing the ethylene oxide and propylene oxide units randomly distributed. The oligomers of ethylene oxide and/or propylene oxide are also suitable for preparing the crosslinkers, examples being diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Further suitable crosslinkers include vinyl acrylate, vinyl methacrylate, vinyl itaconate, divinyl adipate, butanediol divinyl ether, trimethylolpropane trivinyl ether, allyl acrylate, allyl methacrylate, pentaerythritol triallyl ether, triallylsucrose, pentaallylsucrose, methylenebis(meth) acrylamide, divinylethyleneurea, divinylpropyleneurea, divinylbenzene, divinyldioxane, triallyl cyanurate, tetraallylsilane, tetravinylsilane and bis- or polyacrylic siloxanes (e.g., Tegomers® from Th. Goldschmidt AG). The crosslinkers are used preferably in amounts of from 10 ppm to 5% by weight, based on the monomers to be polymerized.

In addition to the abovementioned constituents, the compositions of the invention may include customary additives, depending on their intended application.

The components which may be present additionally in the composition of the invention are added after the end of the emulsion polymerization.

Furthermore, the compositions of the invention may include customary additives, depending on their intended application. Examples which may be present include bactericides or fungicides. Furthermore, they may include hydrophobicizing agents in order to increase the water resistance of the treated substrates. Suitable hydrophobicizing agents are customary aqueous paraffin dispersions or silicones. In addition, the compositions may comprise wetting agents, thickeners, plasticizers, retention agents, pigments, and fillers.

Finally, the compositions of the invention may comprise customary flame retardants, such as aluminum silicates, aluminum hydroxides, borates and/or phosphates, for example.

In many cases the compositions also include coupling reagents, such as alkoxysilanes, an example being 3-aminopropyltriethoxysilane, soluble or emulsifiable oils as lubricants and dust binders, and also wetting auxiliaries.

The compositions of the invention may also be used as blends with other binders, such as urea-formaldehyde resins, melamine-formaldehyde resins or phenol-formaldehyde resins, for example, and with epoxy resins.

The compositions of the invention are formaldehyde-free. Formaldehyde-free denotes that the compositions of the invention contain no substantial amounts of formaldehyde and also that no substantial amounts of formaldehyde are released in the course of drying and/or curing. In general, the compositions contain <100 ppm formaldehyde. They permit the production of moldings with a short curing time, and give the moldings excellent mechanical properties.

Prior to their use, the heat-curable formaldehyde-free compositions of the invention are essentially uncrosslinked and are therefore thermoplastic. If required, however, a low level of precrosslinking of the polymer A1 may be established, by using, for example, monomers having two or more polymerizable groups.

The dispersions of the invention essentially comprise finely divided emulsion polymer particles of A1 and an aqueous phase comprising the polymer A2 and, if desired, separately added amine or amine not reacted during the esterification, and also, if appropriate, further water-soluble additives, e.g., crosslinkers.

Within the aqueous phase, superstructures may be formed, examples of such superstructures being lyotropic phases formed by lamellar or spherical aggregates.

The monomer composition is generally chosen such that a glass transition temperature Tg in the range from $-60°$ C. to $+150°$ C. results for the polymer A1. The glass transition temperature Tg of the polymers may be determined conventionally by means, for example, of Differential Scanning Calorimetry (DSC). The Tg may also be calculated approximately by means of the Fox equation. According to Fox T. G., Bull. Am. Physics Soc. 1, 3, page 123 (1956), the following is true: $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature, in kelvins, of the homopolymer of the monomer n. Tg values for the homopolymers are listed in Polymer Handbook 3rd Edition, J. Wiley & Sons, New York (1989). For further processing to fibrous insulating panels, it is preferred to use polymers A1 having a glass transition temperature in the range from 60 to 120° C. For further processing to cork products, the glass transition temperature is preferably in the range from $-50$ to 90° C.

The polymer dispersions of the invention are finely particulate stable latices. The weight-average particle size of the latex particles is from about 10 to 1500 nm, preferably from 20 to 1000 nm, with particular preference from 30 to 500 nm, measured with the aid of the analytical ultracentrifuge (AUC).

The polymer dispersions of the invention may be unlimitedly diluted with water or dilute salt or surfactant solutions without coagulation of the latex particles. The compositions of the invention have a nonvolatiles content (solids content) in the range from about 20 to 75% by weight, preferably from 25 to 65% by weight. The viscosity (at a solids content of 40% by weight) is generally in a range from approximately 10 to 4000 mPas, measured using a rotational viscometer in accordance with DIN 53019 at 23° C. and a shear rate of 250 $s^{-1}$.

When the polymer dispersions of the invention are used as binders for fibrous and particulate substrates, such as, for example, wood chips, wood fibers, textile fibers, glass fibers, mineral fibers or natural fibers such as jute, flax, hemp or sisal, and also cork chips or sand, curing thereof gives shaped parts having a high mechanical strength, which also retain their dimensional stability under humid conditions. Heat curing is preferred. The curing temperatures are generally from 80 to 250° C., preferably from 100 to 200° C.

On heating, the water in the composition evaporates and the composition cures (hardens). These processes may proceed simultaneously or in succession. By curing in this context is meant the chemical alteration of the composition; for example, crosslinking by formation of covalent bonds between the different constituents of the compositions, formation of ionic interactions and clusters, and formation of hydrogen bonds. Curing may also be accompanied by physical changes within the binder, such as phase rearrangements or phase inversions, for example. An advantage of the compositions of the invention is that they may be cured at comparatively low temperatures. The duration and temperature of heating influence the degree of cure.

Curing may also take place in two or more stages. For example, in a first step the curing temperature and time may be chosen such that the degree of curing attained is low, and substantially complete curing takes place in a second step. This second step may take place in spatial and temporal separation from the first step. By this means, for example, it becomes possible to use the compositions of the invention to produce semifinished goods which are impregnated with binder and then are shaped and cured at another location.

The invention further provides a bound substrate obtainable by treating a substrate with an aqueous polymer dispersion as described above and then curing it. The substrate is preferably in the form of a molding.

The moldings preferably have a density of from 0.2 to 1.4 $g/cm^3$ at 23° C.

Particularly suitable moldings are sheets and shaped parts having an irregular contour. Their thickness is generally at least 1 mm, preferably at least 2 mm, and their surface area is typically from 200 to 200,000 $cm^2$. Consideration may be given, in particular, to wood fiberboards and chipboards, cork boards, cork blocks and cork molds, insulant boards and insulant rolls made, for example, from mineral fibers and glass fibers, interior automotive parts, such as interior door trim, dashboards, and parcel shelves.

The amount by weight of the binder used is generally from 0.5 to 40% by weight, preferably from 1 to 30% by weight (binder solids), based on the substrate (fibers, slivers or chips).

The fibers, slivers or chips can be coated directly with the binder or mixed with the aqueous binder. The viscosity of the aqueous binder is preferably adjusted to from 10 to 4000, with particular preference to from 30 to 2000 mPas (DIN 53019, rotational viscometer at 250 $s^{-1}$).

The mixture of fibers, slivers and chips and the binder can be subjected to initial drying at temperatures, for example, of from 10 to 150° C. and then to compression molding to form the moldings at temperatures, for example, of from 80 to 250° C., preferably from 100 to 200° C. and under pressures of generally from 2 to 1000 bar, preferably from 10 to 750 bar, with particular preference from 200 to 500 bar.

The binders are particularly suitable for producing wood-base materials such as wood chipboards and wood fiberboards (cf. Ullmanns Encyclopädie der technischen Chemie, 4$^{th}$ edition 1976, volume 12, pp. 709–727), which can be produced by gluing disintegrated wood, such as wood chips and wood fibers, for example. The water resistance of woodbase materials can be enhanced by adding to the binder a customary commercial aqueous paraffin dispersion or other hydrophobicizing agents, or adding said hydrophobicizing agents beforehand or subsequently to the fibers, slivers or chips.

Chipboard production is widely known and is described, for example, in H. J. Deppe, K. Ernst Taschenbuch der Spanplattentechnik, 2$^{nd}$ edition, Verlag Leinfelden 1982.

It is preferred to use chips whose average size is from 0.1 to 4 mm, in particular from 0.2 to 2 mm, and which contain less than 6% by weight of water. However, it is also possible to use considerably coarser chips and those with a higher moisture content. The binder is applied with great uniformity to the wood chips, the weight ratio of binder solids to wood chips preferably being from 0.02:1 to 0.3:1. Uniform distribution can be achieved, for example, by spraying the binder in finely divided form onto the chips.

The glued wood chips are then scattered out to form a layer with a highly uniform surface, the thickness of the layer being guided by the desired thickness of the finished chipboard. The scattered layer is pressed at a temperature of from 100 to 250° C., for example, preferably from 120 to 225° C., by applying pressures of usually from 10 to 750 bar, to form a board. The required press times may vary within a wide range and are generally from 15 seconds to 30 minutes.

The wood fibers of appropriate quality required to produce medium density fiberboard (MDF) panels from the binders can be produced from barkless wood chips by milling in special mills or refiners at temperatures of about 180° C.

For gluing, the wood fibers are generally swirled up in a stream of air and the binder is introduced through nozzles into the resultant fiber stream (blow-line process). The ratio of wood fiber to binder based on the dry-matter content or solids content is usually from 40:1 to 2:1, preferably from 20:1 to 4:1. The glued fibers are dried in the fiber stream at temperatures of, for example, from 130 to 180° C., scattered out to form a fiber web, and pressed under pressures of from 10 to 50 bar to form boards or moldings.

Alternatively, as described for example in DE-A-24 17 243, the glued wood fibers can be processed to a transportable fiber mat. This intermediate can then be processed further to boards or shaped parts, such as door interior trim panels of motor vehicles, for example, in a second, temporally and spatially separate step.

Other natural fiber substances as well, such as sisal, jute, hemp, flax, coconut, banana and other natural fibers, can be processed with the binders to form boards and shaped parts. The natural fiber materials can also be used in mixtures with plastic fibers, such as polypropylene, polyethylene, polyester, polyamides or polyacrylonitrile. In this case the plastic fibers may also function as cobinders in addition to the binder of the invention. The proportion of plastic fibers in this case is preferably less than 50% by weight, in particular less than 30% by weight and, with very particular preference, less than 10% by weight, based on all chips, slivers or fibers. The fibers can be processed by the method used for the wood fiberboards. Alternatively, preformed natural fiber mats can be impregnated with the binders of the invention, with or without the addition of a wetting auxiliary. The impregnated mats, in the binder-moist or predried state, are then pressed at temperatures from 100 to 250° C. under pressures of from 10 to 100 bar, for example, to form boards or shaped parts.

The substrates impregnated with the binders of the invention preferably have a residual moisture content on pressing of from 3 to 20% by weight, based on the substrate to be bound.

The moldings obtained in accordance with the invention feature low water absorption, little increase in thickness (swelling) after storage in water, and good strength, and are formaldehyde-free.

In addition, the compositions of the invention can be used as binders for coating materials and impregnating materials for boards made of organic and/or inorganic fibers, nonfibrous mineral fillers, and starch and/or aqueous polymer dispersions.

The coating and impregnating materials impart a high flexural modulus to the boards. The production of such boards is known.

Boards of this kind are commonly used as soundproofing panels. The thickness of the panels is usually within the range from about 5 to 30 mm, preferably in the range from 10 to 25 mm. The edge length of the square or rectangular panels is usually in the range from 200 to 2000 mm.

In addition, the compositions of the invention may include the auxiliaries customary in coating and impregnating technology. Examples of such auxiliaries are finely divided inert fillers, such as aluminum silicates, quartz, precipitated or pyrogenic silica, light and heavy spar, talc, dolomite or calcium carbonate; color pigments, such as titanium white, zinc white, black iron oxide, etc., foam inhibitors, such as modified dimethylpolysiloxanes, and adhesion promoters, and also preservatives.

The components of the composition of the invention are generally present in the coating material in an amount of from 1 to 65% by weight. The proportion of the inert fillers is generally from 0 to 85% by weight, the proportion of water being at least 10% by weight.

The compositions are employed in a customary manner by application to a substrate, for example, by spraying, rolling, pouring or impregnating. The amounts applied, based on the dry-matter content of the composition, are generally from 2 to 100 g/m$^2$.

The amounts of additives to be used are known to the skilled worker and are guided in each individual case by the desired properties and the intended application.

The compositions of the invention can also be used as binders for insulating materials made from inorganic fibers, such as mineral fibers and glass fibers. Insulating materials of this kind are produced industrially by spinning melts of the corresponding mineral raw materials; see U.S. Pat. No. 2,550,465, U.S. Pat. No. 2,604,427, U.S. Pat. No. 2,830,648, EP-A-354 913 and EP-A-567 480. The composition is then sprayed onto the freshly produced, still hot inorganic fibers. The water then largely evaporates and the composition remains, in essentially uncured form, adhering as a viscous mass to the fibers. A continuous, binder-containing fiber mat produced in this way is transported on by means of appropriate conveyor belts through a curing oven. In the oven, the mat cures at temperatures in the range from about 100 to 200° C. to form a rigid matrix. After curing, the mats of insulating material are processed appropriately.

The predominant fraction of the mineral fibers or glass fibers used in the insulating materials has a diameter in the range from 0.5 to 20 μm and a length in the range from 0.5 to 10 cm.

The compositions of the invention are further suitable as binders for fiber webs.

Examples of fiber webs that may be mentioned are webs of cellulose, cellulose acetate, esters and ethers of cellulose, cotton, hemp, animal fibers, such as wool or hair, and, in particular, webs of synthetic or inorganic fibers, examples being aramid, carbon, polyacrylonitrile, polyester, mineral, PVC, or glass fibers.

In the case of use as binders for fiber webs, the compositions of the invention may include, for example, the following additives: silicates, silicones, boron compounds, lubricants, wetting agents.

Preference is given to glass fiber webs. The unbonded fiber webs (untreated fiber webs), especially of glass fibers, are bound, i.e., consolidated, by the binder of the invention.

For this purpose the binder of the invention is applied to the untreated fiber web by means, for example, of coating, impregnating or soaking preferably in a weight ratio of fiber to binder (solids) of from 10:1 to 1:1, with particular preference from 6:1 to 3:1.

In this case the binder is used preferably in the form of a diluted aqueous composition containing 95 to 40% by weight of water.

Application of the binder to the untreated fiber web is generally followed by drying at, preferably, from 100 to 400° C., in particular from 130 to 280° C., with very particular preference from 130 to 230° C., over a period of preferably from 10 seconds to 10 minutes, in particular from 10 seconds to 3 minutes.

The bonded fiber web obtained has high strength in the dry and wet states. In particular, the binders of the invention permit short drying times and also low drying temperatures.

The bonded fiber webs, especially glass fiber webs, are suitable for use as or in roofing membranes, as base materials for wallpapers, or as inliners or base material for floor coverings made, for example, from PVC.

For use as roofing membranes, the bonded fiber webs are generally coated with bitumen.

The aqueous compositions of the invention can also be used to produce foamed boards or moldings. For this purpose the water present in the composition is first of all removed down to a level of <20% by weight at temperatures of <100° C. The viscous composition thus obtained is then foamed at temperatures >100° C., preferably from 120 to 300° C. Examples of blowing agents which can be used are the residual water still present in the mixture and/or the gaseous reaction products that form in the course of the curing reaction. However, commercially customary blowing agents can also be added. The resultant crosslinked polymer foams can be used, for example, for heat insulation and for soundproofing.

The compositions of the invention can also be used to produce laminates, for decorative applications, for example, by impregnating paper and then carrying out gentle drying, in accordance with the known processes. In a second step, these laminates are laminated onto the substrate to be coated, under pressure and with heat, the conditions being chosen such that curing of the binder takes place.

In addition, the compositions of the invention can be used to produce sandpaper and other abrasives by the production techniques customarily carried out with phenolic resin binders. In the production of sandpapers, a layer of the binders of the invention is first of all applied (judiciously 10 g/m$^2$) as base binder to an appropriate backing paper. The desired amount of particulate abrasive, for example, silicon carbide, corundum, etc., is scattered into the wet base binder. After initial drying, a binder topcoat is applied (e.g., 5 g/m$^2$). The paper coated in this way is then cured by heating at 170° C. for another 5 minutes.

The hardness and flexibility of the composition may be adjusted to the desired level by way of the composition of the polymer A1.

The compositions of the invention are suitable, furthermore, as formaldehyde-free sand binders for producing casting molds and cores for metal casting according to conventional thermal hardening processes (E. Flemming, W. Tilch, Formstoffe und Formverfahren, Dt. Verlag für Grundstoffindustrie, Stuttgart, 1993).

They are also suitable as binders for mold insulating boards.

The nonlimiting examples which follow are intended to illustrate the invention.

The nonvolatiles content was determined from the weight loss of a 1 g sample dried at 120° C. for two hours in a circulating-air drying cabinet.

The viscosity of the compositions was determined in a Rheomat from Physica at a shear rate of 250 sec$^{-1}$ at 23° C. in accordance with DIN 53019.

The K values of the polymers A2 were measured by the method of Fikentscher (DIN 53276).

The pH was determined using a handylab 1 pH meter from Schott.

The dilutability was investigated by succcessively diluting a dispersion sample with deionized water with visible formation of agglomerate resulting in a negative assessment.

The particle size of the polymers of the invention was determined by the method of quasielastic light scattering. For this purpose, the compositions of the invention were diluted to a solids content of 0.01% by weight with 2% strength sodium lauryl sulfate solution and measured in a Malvern Autosizer 2C.

EXAMPLE 1a

Preparation of the Carboxyl-Containing Polymer A2

A pressure reactor with anchor stirrer is charged with 0.55 kg of deionized water, 0.36 kg of maleic anhydride, and 0.91 kg of a 40% strength by weight aqueous solution of an ethoxylated oleylamine (average degree of ethoxylation=12, Lutensol®FA from BASF AG). This initial charge is heated to 125° C. under a nitrogen atmosphere. On reaching this temperature, feed stream 1, consisting of 0.75 kg of deionized water and 1.00 kg of acrylic acid, is metered in over the course of 4 h, and feed stream 2, consisting of 0.22 kg of deionized water and 0.12 kg of H$_2$O$_2$ (30% strength by weight), is metered in over the course of 5 h, both feeds being introduced at a uniform rate. After the end of feed stream 1, a further 0.11 kg of deionized water is added. After the end of the reaction, the mixture is cooled to room temperature. The resultant aqueous polymer solution has a solids content of 43.0%, a pH of 1.7, and a viscosity of 450 mPas. The K value is 13.3.

EXAMPLE 1b

Preparation of a Polymer Dispersion of the Invention

A 4 l glass vessel with anchor stirrer (120 rpm) is charged with 807 g of water, 1279 g of an aqueous solution of the acid polymer A2 (43.0% strength by weight) from Example 1a, 5% by weight of feed stream 1 and 10% by weight of feed stream 2, and this initial charge is heated to 90° C. After 2 minutes, at this temperature, the remainder of feed stream 1 is metered in over the course of 3 h and the remainder of feed stream 2 over the course of 3.5 h, the feed points being spatially separate. Subsequently, polymerization is continued at this temperature for 30 minutes and the reaction mixture is cooled. The polymer dispersion prepared in this way contains 38.9% by weight nonvolatiles and has a pH of 2.0. The viscosity of the resultant polymer dispersion is 215 mPas (at 250 s$^{-1}$).

Feed Stream 1:
325 g of styrene
293 g of methyl methacrylate
33 g of methacrylic acid
Feed Stream 2:
150 g of deionized water
6.5 g of sodium peroxodisulfate

EXAMPLE 2

Preparation of a Polymer Dispersion of the Invention

The preparation was as in Example 1b, using the starting materials set out below. The polymer dispersion prepared in this way contains 44.5% by weight nonvolatiles and has a pH of 1.9. The viscosity of the resultant polymer dispersion is 767 mPas.
Initial charge:
478 g of deionized water
1279 g of an acid polymer A2 (43% strength by weight), as in Example 1a
Feed Stream 1:
325 g of styrene
293 g of methyl methacrylate
33 g of acetoacetoxyethyl methacrylate
Feed Stream 2:
150 g of deionized water
6.5 g of sodium peroxodisulfate

EXAMPLE 3

Preparation of a Polymer Dispersion of the Invention

A 4 l glass vessel with anchor stirrer (120 rpm) is charged with 372 g of water and 10% by weight of feed stream 2, and this initial charge is heated to 85° C. After 2 minutes, at this temperature, feed stream 1 is metered in over the course of 3 h and the remainder of feed stream 2 over the course of 3.5 h, the feed points being spatially separate. Subsequently, polymerization is continued at this temperature for 30 minutes and the reaction mixture is cooled. The polymer dispersion prepared in this way contains 50.3% by weight nonvolatiles and has a pH of 2.1. The viscosity of the resultant polymer dispersion is 982 mPas (at 250 s$^{-1}$). Subsequently, 314 g of an aqueous solution (50% by weight) of 2,2',2"-nitrilotriethanol are added. The pH of the mixture is 3.0.
Feed Stream 1:
1308 g of the acid polymer from Example 1a (43% strength by weight)
525 g of styrene
188 g of methyl methacrylate
38 g of 2-hydroxyethyl acrylate
Feed Stream 2:
1003 g of deionized water
7.5 g of sodium peroxodisulfate

EXAMPLE 4

Preparation of a Polymer Dispersion of the Invention

In a 1 l glass vesssel, 45 g of adipic acid bis(diethanolamide) (Primid® XL 552 from EMS Chemie) are added to 500 g of the dispersion prepared in Example 3, and the mixture is stirred intimately. The pH of the mixture is 1.8.

EXAMPLE 5

Preparation of a Polymer Dispersion of the Invention

A 4 l glass vessel with anchor stirrer (120 rpm) is charged with 747 g of water, 1231 g of an aqueous solution of the acid polymer A2 (46.0% strength by weight) from Example 1a, 5% by weight of feed stream 1 and 10% by weight of feed stream 2, and this initial charge is heated to 85° C. After 2 minutes, at this temperature, the remainder of feed stream 1 is metered in over the course of 3 h and the remainder of feed stream 2 over the course of 3.5 h, the feed points being spatially separate. Subsequently, polymerization is continued at this temperature for 30 minutes and the reaction mixture is cooled. The polymer dispersion prepared in this way contains 40.1% by weight nonvolatiles and has a pH of 1.9. The viscosity of the resultant polymer dispersion is 1170 mPas (at 250 s$^{-1}$). Subsequently, 140 g of an aqueous solution (50% by weight) of 2,2',2"-nitrilotriethanol and 20 g of hypophosphorous acid are added. The pH of the mixture is 2.8, the LD 42.
Feed Stream 1:
150 g of styrene
563 g of 2-ethylhexyl acrylate
38 g of 2-hydroxyethyl acrylate
Feed Stream 2:
90 g of deionized water
8 g of sodium peroxodisulfate

EXAMPLE 6a

Preparation of the Carboxyl-Containing polymer A2

A pressure reactor with anchor stirrer is charged with 0.55 kg of deionized water, 0.27 kg of maleic anhydride, and 0.15 kg of a 40% strength by weight aqueous solution of an ethoxylated oleylamine (average degree of ethoxylation=12, Lutensol®FA from BASF AG). This initial charge is heated to 125° C. under a nitrogen atmosphere. On reaching this temperature, feed stream 1, consisting of 0.75 kg of deionized water and 1.09 kg of acrylic acid, is metered in over the course of 4 h, and feed stream 2, consisting of 0.22 kg of deionized water and 0.12 kg of $H_2O_2$ (30% strength by weight), is metered in over the course of 5 h, both feeds being introduced at a uniform rate. After the end of feed stream 1, a further 0.11 kg of deionized water is added. After the end of the reaction, the mixture is cooled to room temperature. The resultant aqueous polymer solution has a solids content of 44.6%, a pH of 1.2, and a viscosity of 342 mPas. The K value is 16.1.

EXAMPLE 6b

Preparation of a Polymer Dispersion of the Invention

A 4 l glass vessel with anchor stirrer (120 rpm) is charged with 208 g of water and 10% by weight of feed stream 2, and this initial charge is heated to 85° C. After 2 minutes, at this temperature, feed stream 1 is metered in over the course of 3 h and the remainder of feed stream 2 over the course of 3.5 h, the feed points being spatially separate. Subsequently, polymerization is continued at this temperature for 30 minutes and the reaction mixture is cooled. The polymer dispersion prepared in this way contains 40.0% by weight nonvolatiles and has a pH of 2.0. The viscosity of the resultant polymer dispersion is 48 mPas, the particle size 297 nm.
Feed Stream 1:
1682 g of the acid polymer A2 from Example 6a
325 g of methyl methacrylate
150 g of n-butyl acrylate
25 g of glycidyl methacrylate
Feed Stream 2:
50 g of deionized water
5 g of sodium peroxodisulfate

EXAMPLE 7a

Preparation of the Carboxyl-Containing Polymer A2

A pressure reactor with anchor stirrer is charged with 0.66 kg of deionized water, 0.82 kg of maleic anhydride, and 0.45 kg of a 40% strength by weight aqueous solution of an ethoxylated oleylamine (average degree of ethoxylation=12, Lutensol®FA from BASF AG). This initial charge is heated to 125° C. under a nitrogen atmosphere. On reaching this temperature, feed stream 1, consisting of 0.90 kg of deionized water and 0.82 kg of acrylic acid, is metered in over the course of 4 h, and feed stream 2, consisting of 0.26 kg of deionized water and 0.14 kg of $H_2O_2$ (30% strength by weight), is metered in over the course of 5 h, both feeds being introduced at a uniform rate. After the end of feed stream 1, a further 0.13 kg of deionized water is added. After the end of the reaction, the mixture is cooled to room temperature. The resultant aqueous polymer solution has a solids content of 43.2%, a pH of 1.8, and a viscosity of 72 mPas. The K value is 9.0.

EXAMPLE 7b

Preparation of a Polymer Dispersion of the Invention

The preparation was as in Example 3, using the starting materials set out below. The polymer dispersion prepared in this way contains 52.1% by weight nonvolatiles and has a pH of 2.1. The viscosity of the resultant polymer dispersion is 916 mPas. Subsequently, 145 g of an aqueous solution (50% by weight) of ethoxylated diethylenetriamine (each NH hydrogen atom is ethoxylated once on average) are added.
Initial Charge:
551 g of deionized water
10.85 g of feed stream 2
Feed Stream 1:
953 g of the acid polymer A2 from Example 7a
595 g of styrene
213 g of methyl methacrylate
43 g of 2-hydroxyethyl acrylate
Feed Stream 2:
100 g of deionized water
8.5 g of sodium peroxodisulfate

COMPARATIVE EXAMPLE C1

A 4 l glass vessel with anchor stirrer (120 rpm) is charged with 516 g of water, 1020 g of a 50.0% strength by weight aqueous solution of an acid polymer synthesized from 50 parts by weight of acrylic acid units and 50 parts by weight of maleic acid units (pH 0.8, K value 12), 319 g of a 40% strength by weight aqueous solution of an ethoxylated oleylamine (average degree of ethoxylation=12, Lutensol®FA from BASF AG), 5% by weight of feed stream 1 and 10% by weight of feed stream 2, and this initial charge is heated to 85° C. After 2 minutes, at this temperature, the remainder of feed stream 1 is metered in over the course of 3 h and the remainder of feed stream 2 over the course of 3.5 h, the feed points being spatially separate. Subsequently, polymerization is continued at this temperature for 30 minutes and the reaction mixture is cooled. The polymer dispersion prepared in this way contains 49.0% by weight nonvolatiles and has a pH of 1.9. The viscosity of the resultant polymer dispersion is 97 mPas (at 250 s$^{-1}$).
Feed Stream 1:
637 g of styrene
170 g of methyl methacrylate
43 g of 2-hydroxyethyl acrylate
Feed Stream 2:
150 g of deionized water
8.5 g of sodium peroxodisulfate
In a 1 l glass vessel, 53.4 g of an aqueous solution (50% by weight) of 2,2',2"-nitrilotriethanol are added to 445 g of the dispersion prepared in Example C1, and the mixture is stirred intimately. The pH of the mixture is 3.2.

COMPARATIVE EXAMPLE C2

A 4 l glass vessel with anchor stirrer was charged with 590 g of water, 4.7 g of a 15% strength aqueous sodium lauryl sulfate solution, 35 g of styrene, 35 g of ethyl acrylate, and 2.1 g of acrylic acid, and this initial charge was heated to 85° C. On reaching this temperature, feed streams 1 and 2 were commenced simultaneously. Feed stream 1 consisted of a stirred emulsion of 550 g of water, 88.6 g of 15% strength sodium lauryl sulfate solution, 665 g of styrene, 665 g of ethyl acrylate and 40 g of acrylic acid and was metered in over the course of 3 h. Feed stream 2 was a solution of 8.4 g of sodium peroxodisulfate in 200 g of water and was metered in over the course of 3.5 h. The mixture was subsequently cooled to 70° C. and 14 g of a 10% strength aqueous solution of tert-butyl hydroperoxide and also 6.3 g of a 0.20% strength aqueous solution of sodium hydroxymethanesulfinate were added over the course of 1 h. SC: 50.3%, LT: 73, pH: 1.7.

200 g of the aqueous dispersion prepared in this way were added over the course of 15 minutes with stirring to a mixture of 470 g of a 50% strength by weight aqueous solution of an acid polymer (synthesized from 50 parts by weight of acrylic acid units and 50 parts by weight of maleic acid units, pH 0.8, K value 12), 319 g of a 40% strength by weight aqueous solution of an ethoxylated oleylamine (average degree of ethoxylation=12, Lutensol®FA from BASF AG), and 70 g of 2,2',2"-nitrilotriethanol. The solids content of this mixture was 53%, the pH 3.1, and the viscosity 190 mPas.

Dilutability of the Exemplary Dispersions:

| Example | Dilutability |
| --- | --- |
| 1b | + |
| 2 | + |
| 3 | + |
| 4 | + |
| 5 | + |
| 6b | + |
| 7b | + |
| C1 | − |
| C2 | + |

A) Testing as Binders for Natural Fiber Mats

A fiber mat composed of a 1:1 mixture of jute and sisal fibers (average basis weight 1200 g/m$^2$, residual moisture content 7%, manufactured by Braunschweiger Jute- und Flachs Industriebetriebs-GmbH) is impregnated using a padder roll (manufacturer: Werner Mathis AC, Niederhasli/CH, type Mathis 2-roll laboratory padder, type VFM) with the stated binders. For this purpose, these binders are diluted to a solids content of 25%. Based on the dry fiber weight, 30% by weight of nonvolatile binder fractions are applied.

The impregnated fiber mats (35×30 cm) are dried in a circulating-air drying cabinet at 80° C. to a residual moisture content of 10%, based on dry fibers, and are then pressed using a hydraulic press (manufacturer: Wickert Maschinenbau GmbH, Landau, Germany, model WKP 600/3.5/3) at a temperature of 200° C. for 60 seconds between 2 metal plates with 2 mm spacers. Initially, a compressive pressure of 50 bar is established for 30 seconds; then, after removing the pressure for 3 seconds, a pressure of 100 bar is exerted for a further 27 seconds.

The resultant fiberboards are stored under standard climatic conditions at 23° C./65% relative humidity for 24 h and then tested. The flexural modulus is measured by means of the three-point bending test to DIN 52352 at different test temperatures (23, 60 and 120° C.). The thickness swelling (TS) is measured as the relative increase in thickness of 3×30 cm strips of compressed fiber mats after 7 d of storage in a controlled-climate cabinet (from Weiss Umwelttechnik GmbH, Reiskirchen/Germany, model SB22/300/40) at 80° C. and 90% relative humidity.

Jute-Sisal Fiberboards 30% by Weight Binder

| Binder | Ex. No. | 1b | 2 | 3 | 4 | C1 |
|---|---|---|---|---|---|---|
| Thickness | mm | 2.04 | 2.19 | 1.9 | 1.95 | 1.98 |
| Density | g/cm$^3$ | 0.72 | 0.7 | 0.78 | 0.75 | 0.71 |
| Thickness swelling | % | 15 | 16 | 12 | 13 | 24 |

| Jute-sisal fiberboards 30% by weight binder Binder | Ex. No. | 3 | 4 | C1 |
|---|---|---|---|---|
| Flexural modulus 23° C. | N/mm$^2$ | 4000 | 4300 | 3500 |
| Flexural modulus 60° C. | N/mm$^2$ | 3900 | 3700 | 2900 |
| Flexural modulus 120° C. | N/mm$^2$ | 1700 | 1600 | 1200 |

B) Testing as Binder for Wood Fibers

Sprucewood chips are digested thermomechanically in a refiner (see: "Gewinnung und Eigenschaften von Holzfasern", Holzzentralblatt No. 36 of 24.03.1999, pp. 516–517), glued in a blow-line with the stated binder (binder liquor concentration 35%, add-on 15% by weight, solids based on the dry wood fibers) and dried in a pneumatic fiber dryer with hot air (entry temperature 120° C., exit temperature 80° C.).

200 g of the glued fibers (residual moisture content approximately 12% based on dry fibers, average fiber length approximately 3 mm) are scattered to form fiber mats measuring 30×30 cm. These fiber mats are pressed in a hydraulic press (from Wickert Maschinenbau GmbH, Landau, Germany, model WKP 600/3.5/3) at a temperature of 200° C. for 105 seconds between 2 metal plates with 2 mm spacers. First of all, a compressive pressure of 50 bar is established for 45 seconds, then, after removing the pressure for 5 seconds, a pressure of 200 bar is exerted for a further 55 seconds.

The fiberboards obtained are stored under standard climatic conditions at 23° C./65% relative humidity for 24 h and then tested. The flexural modulus was determined at 23° C. by means of the three-point bending test to DIN 52352. The thickness swelling of the wood fiberboards is measured as the relative increase in the thickness of 2×2 cm sample specimens after storage in demineralized water for 24 h in analogy to DIN 52351.

Wood Fiberboards, 15% by Weight Binder

| Binder | Ex. No. | 3 | C2 |
|---|---|---|---|
| Board thickness | mm | 2.1 | 2 |
| Density | g/cm$^3$ | 0.92 | 0.97 |
| Flexural modulus | N/mm$^2$ | 3300 | 3300 |
| Thickness swelling | % | 21 | 34 |

C) Testing as Binders for Cork Granules:

In a Kenwood laboratory mixer, 80 g of dried cork granules (cleaned and ground cork, bulk density 60 g/l, average particle size 1.5 mm) and 35 g of the 40% strength binder from Example 5 are mixed for 2 minutes. The binder-treated cork particles are introduced without further drying into a two-part metal mold (internal dimensions 15×15 cm) in which they are precompacted. The bottom and die of the mold are perforated with vent holes to take off the water vapor that is released. The metal mold is held in a Wickert press (see A), preheated to 115° C., at a pressure of 100 bar for 2 h.

The result is a cork block having a density of 0.20 g/cm$^3$. The thickness swelling of 5×5×3 cm sample specimens of this block after storage in demineralized water at 23° C. for 24 h is 2.2%. After boiling for three hours in demineralized water, the thickness swelling is 1%. A cork block obtained as described above is cut into sample plates 5 mm thick using a bandsaw. The tensile strength of these flexible cork plates, measured in accordance with ISO 7322, is 0.6 MPa.

In a Kenwood laboratory mixer, 130 g of dried cork granules (cleaned and ground cork, bulk density 90 g/l, average particle size approximately 8 mm) and 21 g of the respective 50% strength binders from the examples set out below are mixed for 2 minutes. The binder-treated cork particles are introduced without further drying into the metal mold described above in which they are pressed at a temperature of 130° C. for 2 h at a pressure of 100 bar.

These rigid cork blocks are cut into sample specimens 5×5×3 cm, whose thickness swelling is tested under the conditions indicated above.

| Binder | Ex. No. | 2 | 3 | 6b | 7b |
|---|---|---|---|---|---|
| Thickness swelling (24 h H$_2$O, 23° C.) | % | 1 | 1 | 3 | 1 |
| Thickness swelling (3 h boiling in H$_2$O) | % | 12 | 18 | 17 | 15 |

D) Testing as Binders for Finely Divided Mineral Materials 300 g of quartz sand H34 were mixed with the binder compositions at room temperature (5% by weight dry binder, based on sand). The moist mixtures are shaped in a corresponding metal mold into test specimens (Fischer bars) measuring 17×2.3×2.3 cm, which are precompacted and then, after demolding, cured at 125° C. in a convection oven for 2 h. Compaction is carried out using a ram of type PRA from Georg Fischer AG.

The bending strength of the Fischer bars thus produced is determined in the dry state at 23° C. with a specimen temperature of 100° C. in a strength testing apparatus type PFG with the test device PBV (from Georg Fischer, Schaffhausen/CH). Also measured is the bending strength of the Fischer bars in the wet state, following one hour of storage in demineralized water at 23° C.

Sand Test Specimens, 5% by Weight Binder Solids

| Binder | Ex. No. | 3 | 4 | C1 |
|---|---|---|---|---|
| Bending strength, dry 23° C. | N/cm$^2$ | 1250 | 1270 | 1230 |
| Bending strength, dry 100° C. | N/cm$^2$ | 1120 | 1130 | 950 |
| Bending strength, wet 23° C. | N/cm$^2$ | 950 | 1080 | 470 |

E) Testing as Coating

The binder from Example 5 is applied to a glass plate using a coating bar; the wet film thickness was 200 μm. The film was dried at room temperature for 24 h. The samples were subsequently cured in a drying cabinet at the stated temperatures and for the stated times.

The pendulum hardness was determined by the König method (DIN 53157) using a Labotron 5852 pendulum hardness instrument from Byk Mallinckrodt GmbH.

| Crosslinking time at 150° C., in min | Pendulum hardness in sec |
|---|---|
| 0 | 10 |
| 2 | 23 |

-continued

| Crosslinking time at 150° C., in min | Pendulum hardness in sec |
|---|---|
| 5 | 76 |
| 10 | 126 |
| 15 | 132 |

We claim:

1. An aqueous polymer dispersion comprising dispersed polymer particles of at least one addition polymer A1 obtained by free-radical emulsion polymerization in the presence of an addition polymer A2 synthesized from from 50 to 99.5% by weight of at least one ethylenically unsaturated mono- and/or dicarboxylic acid, from 0.5 to 50% by weight of at least one ethylenically unsaturated compound selected from the group consisting of esters of ethylenically unsaturated monocarboxylic acids, monoesters of ethylenically unsaturated dicarboxylic acids and diesters of ethylenically unsaturated dicarboxylic acids wherein each ester is obtained by esterifying with an amine having at least one hydroxyl group, and up to 20% by weight of at least one further monomer.

2. The dispersion as claimed in claim 1, wherein the polymer A2 comprises as the ethylenically unsaturated mono- and/or dicarboxylic acid at least one compound selected from the group consisting of $C_3$–$C_{10}$ monocarboxylic acids and $C_4$–$C_8$ dicarboxylic acids.

3. The dispersion as claimed in claim 1, wherein said amine having at least one hydroxyl group is an amine of the formula $$R^cNR^aR^b$$

where $R^c$ is $C_6$ to $C_{22}$ alkyl, $C_6$ to $C_{22}$ alkenyl, aryl-$C_6$–$C_{22}$ alkyl or aryl-$C_6$–$C_{22}$ alkenyl, it being possible for the alkenyl radical to have 1, 2 or 3 nonadjacent double bonds, $R^a$ is hydroxy-$C_1$–$C_6$ alkyl or a radical of the formula II $$\text{—(CH}_2\text{CH}_2\text{O)}_x(\text{CH}_2\text{CH(CH}_3)\text{O)}_y\text{—H} \quad (II)$$

where in the formula II the sequence of the alkylene oxide units is arbitrary and x and y independently of one another are integers from 0 to 100, the sum of x and y being >1, $R^b$ is hydrogen, $C_1$ to $C_{22}$ alkyl, hydroxy-$C_1$–$C_6$ alkyl, $C_6$ to $C_{22}$ alkenyl, aryl-$C_6$–$C_{22}$ alkyl, aryl-$C_6$–$C_{22}$ alkenyl or $C_5$ to $C_8$ cycloalkyl, it being possible for the alkenyl radical to have 1, 2 or 3 nonadjacent double bonds, or $R^b$ is a radical of the formula III $$\text{—(CH}_2\text{CH}_2\text{O)}_v(\text{CH}_2\text{CH(CH}_3)\text{O)}_w\text{—H} \quad (III)$$

where in the formula III the sequence of the alkylene oxide units is arbitrary and v and w independently of one another are integers from 0 to 100, and mixtures thereof.

4. The dispersion as claimed in claim 1, wherein the weight ratio based on solids of polymer A1 to polymer A2 is in the range from 7:1 to 1:7.

5. The dispersion as claimed in claim 1, further comprising up to 50% by weight, based on the polymer A2, of at least one amine of the formula $$R^cNR^aR^b$$

where $R^c$ is $C_6$ to $C_{22}$ alkyl, $C_6$ to $C_{22}$ alkenyl, aryl-$C_6$–$C_{22}$ alkyl or aryl-$C_6$–$C_{22}$ alkenyl, it being possible for the alkenyl radical to have 1, 2 or 3 nonadjacent double bonds, $R^a$ is hydroxy-$C_1$–$C_6$ alkyl or a radical of the formula II $$\text{—(CH}_2\text{CH}_2\text{O)}_x(\text{CH}_2\text{CH(CH}_3)\text{O)}_y\text{—H} \quad (II)$$

where in the formula II the sequence of the alkylene oxide units is arbitrary and x and y independently of one another are integers from 0 to 100, the sum of x and y being >1, $R^b$ is hydrogen, $C_1$ to $C_{22}$ alkyl, hydroxy-$C_1$–$C_6$ alkyl, $C_6$ to $C_{22}$ alkenyl, aryl-$C_6$–$C_{22}$ alkyl, aryl-$C_6$–$C_{22}$ alkenyl or $C_5$ to $C_8$ cycloalkyl, it being possible for the alkenyl radical to have 1, 2 or 3 nonadjacent double bonds, or $R^b$ is a radical of the formula III $$\text{—(CH}_2\text{CH}_2)_v(\text{CH}_2\text{CH(CH}_3)\text{O)}_w\text{—H} \quad (III)$$

where in the formula III the sequence of the alkylene oxide units is arbitrary and v and w independently of one another are integers from 0 to 100.

6. The dispersion as claimed in claim 1, further comprising at least one amine or amide crosslinker having at least two hydroxyl groups.

7. The dispersion as claimed in claim 1, further comprising at least one reaction accelerant.

8. The dispersion as claimed in claim 1, wherein said reaction accelerant is elected from the group consisting of phosphorus compounds.

9. The dispersion as claimed in claim 1, wherein the polymer A1 is synthesized from from 80 to 100% by weight, based on the overall weight of the monomers for the polymer, of at least one ethylenically unsaturated principal monomer, and up to 20% by weight, based on the overall weight of the monomers for the polymer, of at least one ethylenically unsaturated comonomer, wherein the principal monomer is selected from the group consisting of an ester of a $C_3$–$C_6$ α,β-monoethylenically unsaturated monocarboxylic acid, an ester of a $C_3$–$C_6$ α,β-monoethylenically unsaturated dicarboxylic acid, a vinylaromatic compound, a vinyl ester of a $C_1$–$C_{18}$ monocarboxylic acid, a vinyl ester of a $C_1$–$C_{18}$ dicarboxylic acid, butadiene, a linear olefin, a branched chain olefin, a 1-olefin, a cyclic olefin, acrylonitrile, methacrylonitrile, a vinyl alkyl ether, an allyl alkyl ether and mixtures thereof, and the comonomer is selected from the group consisting of an ethylenically unsaturated monocarboxylic acid, an ethylenically unsaturated dicarboxylic acid, and anhydride of an ethylenically unsaturated monocarboxylic acid, and anhydride of an ethylenically unsaturated dicarboxylic acid, an acrylamide, an alkyl acrylamide, a sulfo-functional monomer, a $C_1$–$C_4$ hydroxyalkyl ester of a $C_3$–$C_6$ dicarboxylic acid, an alkylamino (meth)acrylate, an ally ester, an N-vinyl compound, a monomer containing a 1,3-diketo group, a monomer containing a silyl group, a monomer containing a glycidyl group and mixtures thereof.

10. The dispersion as claimed in claim 1, comprising from 70 to 50% by weight of polymer A1, from 30 to 50% by weight of polymer A2, from 0 to 10% by weight of surface-active alkoxylated alkylamine, from 0 to 20% by weight of one or more hydroxyl-containing crosslinkers, and from 0 to 5% by weight of one or more reaction accelerants.

11. A process for preparing an aqueous polymer dispersion as claimed in claim 1 by free-radical emulsion polymerization of at least one ethylenically unsaturated monomer to give a polymer A1, said polymerization taking place in the presence of at least one polymer A2.

12. The bound substrate obtained by treating a substrate with an aqueous polymer dispersion as claimed in claim 1 and then curing it.

13. A substrate as claimed in claim 12 in the form of a molding.

14. The dispersion as claimed in claim 2, wherein the ethylenically unsaturated monocarboxylic acid or the ethylenically unsaturated dicarboxylic acid is selected from the group consisting of acrylic acid, methacrylic acid, crotonic acid, fumaric acid, maleic acid, 2-methylmaleic acid, and itaconic acid.

15. The dispersion as claimed in claim 4, wherein the weight ratio based an solids of polymer A1 to polymer A2 is from 3:1 to 1:3.

16. The dispersion as claimed in claim 8, wherein the accelerant is hypophosphorous acid, alkali metal salts of hypophosphorous acid and alkaline earth metal salts of hypophosphorous acid.

17. A method for binding substrates, said method comprising applying the dispersion as claimed in claim 1 to one or more substrates and contacting said substrates to one another.

18. The method as claimed in claim 17, wherein the substrates are moldings.

19. The method of claim 18, wherein the substrates are derived from fibrous or particulate materials.

20. The method as claimed in claim 19, wherein the materials are selected from the group consisting of wood chips, wood fibers, textile fibers, glass fibers, mineral fibers, natural fibers, cork chips and sand.

* * * * *